US012518910B2

(12) United States Patent
Lee et al.

(10) Patent No.: US 12,518,910 B2
(45) Date of Patent: Jan. 6, 2026

(54) COIL COMPONENT

(71) Applicant: SAMSUNG ELECTRO-MECHANICS CO., LTD., Suwon-si (KR)

(72) Inventors: Jong Rock Lee, Suwon-si (KR); Mi Geum Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 789 days.

(21) Appl. No.: 17/848,814

(22) Filed: Jun. 24, 2022

(65) Prior Publication Data

US 2023/0014633 A1 Jan. 19, 2023

(30) Foreign Application Priority Data

Jul. 16, 2021 (KR) ........................ 10-2021-0093649

(51) Int. Cl.
*H01F 27/28* (2006.01)
*H01F 27/255* (2006.01)
*H01F 27/29* (2006.01)

(52) U.S. Cl.
CPC ........... *H01F 27/29* (2013.01); *H01F 27/255* (2013.01)

(58) Field of Classification Search
CPC .......... H01F 27/29; H01F 27/255; H01F 1/24; H01F 27/292; H01F 2017/048;
(Continued)

(56) References Cited

U.S. PATENT DOCUMENTS

2016/0086716 A1* 3/2016 Choi .................. H01F 17/0013 427/127
2016/0260535 A1* 9/2016 Kubota ............... H01F 17/0013
(Continued)

FOREIGN PATENT DOCUMENTS

JP 2012-089765 A 5/2012
JP 2016-178282 A 10/2016
(Continued)

OTHER PUBLICATIONS

Korean Office Action dated Oct. 10, 2025 issued in Korean Patent Application No. 10-2021-0093649 (with English translation).

*Primary Examiner* — Shawki S Ismail
*Assistant Examiner* — Kazi S Hossain
(74) *Attorney, Agent, or Firm* — MORGAN, LEWIS & BOCKIUS LLP

(57) ABSTRACT

A coil component includes: a body containing magnetic metal particles and an insulating resin; a coil portion disposed in the body; and first and second external electrodes disposed on the body while being spaced apart from each other and connected to opposite end portions of the coil portion, respectively, wherein a surface of the body has first and second regions in which the first and second external electrodes are disposed, respectively, and a third region in which the first and second external electrodes are not disposed, some of the magnetic metal particles are exposed to the third region of the body, and a monomolecular organic material having a hydrophobic portion is disposed at an exposed surface of the magnetic metal particle exposed to the third region of the body.

20 Claims, 7 Drawing Sheets

A

(58) Field of Classification Search
CPC .... H01F 17/0013; H01F 27/022; H01F 17/04; H01F 1/20; H01F 27/2804; H01F 27/2823
USPC .......................................... 336/192, 200, 232
See application file for complete search history.

(56) References Cited

U.S. PATENT DOCUMENTS

| | | | |
|---|---|---|---|
| 2016/0276089 A1 | 9/2016 | Inoue et al. | |
| 2017/0084385 A1 | 3/2017 | Ida | |
| 2018/0137965 A1* | 5/2018 | Lee | H01F 17/0033 |
| 2018/0218825 A1 | 8/2018 | Sato | |
| 2018/0286565 A1 | 10/2018 | Aoki et al. | |
| 2018/0301272 A1* | 10/2018 | Sundaram | H01F 27/24 |
| 2019/0122810 A1 | 4/2019 | Oh et al. | |
| 2020/0152370 A1* | 5/2020 | Kang | H01F 27/29 |

FOREIGN PATENT DOCUMENTS

| | | |
|---|---|---|
| JP | 2016-201466 A | 12/2016 |
| JP | 2018-125375 A | 8/2018 |
| JP | 2018-170429 A | 11/2018 |
| KR | 10-1912291 B1 | 10/2018 |

* cited by examiner

B

COIL COMPONENT

CROSS-REFERENCE TO RELATED APPLICATION(S)

This application claims benefit of priority to Korean Patent Application No. 10-2021-0093649 filed on Jul. 16, 2021 in the Korean Intellectual Property Office, the disclosure of which is incorporated herein by reference in its entirety.

BACKGROUND

1. Field

The present disclosure relates to a coil component.

2. Description of Related Art

An inductor, a coil component, is a representative passive electronic component used in an electronic device, together with a resistor and a capacitor.

As electronic devices gradually increase in performance and become smaller, the number of electronic components used in electronic devices has increased, and electronic components have decreased in size.

In the case of a thin-film type inductor, a body is formed by stacking and curing magnetic composite sheets containing magnetic metal particles and an insulating resin on an insulating substrate on which a coil portion is formed by plating, and external electrodes are formed on a surface of the body.

In order to reduce the thickness of the component, some of the external electrodes may be formed by plating. In this case, plating bleeding may occur due to magnetic metal particles exposed to the surface of the body.

SUMMARY

An aspect of the present disclosure may provide a coil component capable of preventing deteriorations in reliability due to plating bleeding during plating for forming an external electrode.

Another aspect of the present disclosure may provide a coil component for reducing the number of processes required therefor.

According to an aspect of the present disclosure, a coil component may include: a body containing magnetic metal particles and an insulating resin; a coil portion disposed in the body; and first and second external electrodes disposed on the body while being spaced apart from each other and connected to opposite end portions of the coil portion, respectively, wherein a surface of the body has first and second regions in which the first and second external electrodes are disposed, respectively, and a third region in which the first and second external electrodes are not disposed, some of the magnetic metal particles are exposed to the third region of the body, and a monomolecular organic material having a hydrophobic portion is disposed at an exposed surface of the magnetic metal particle exposed to the third region of the body.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
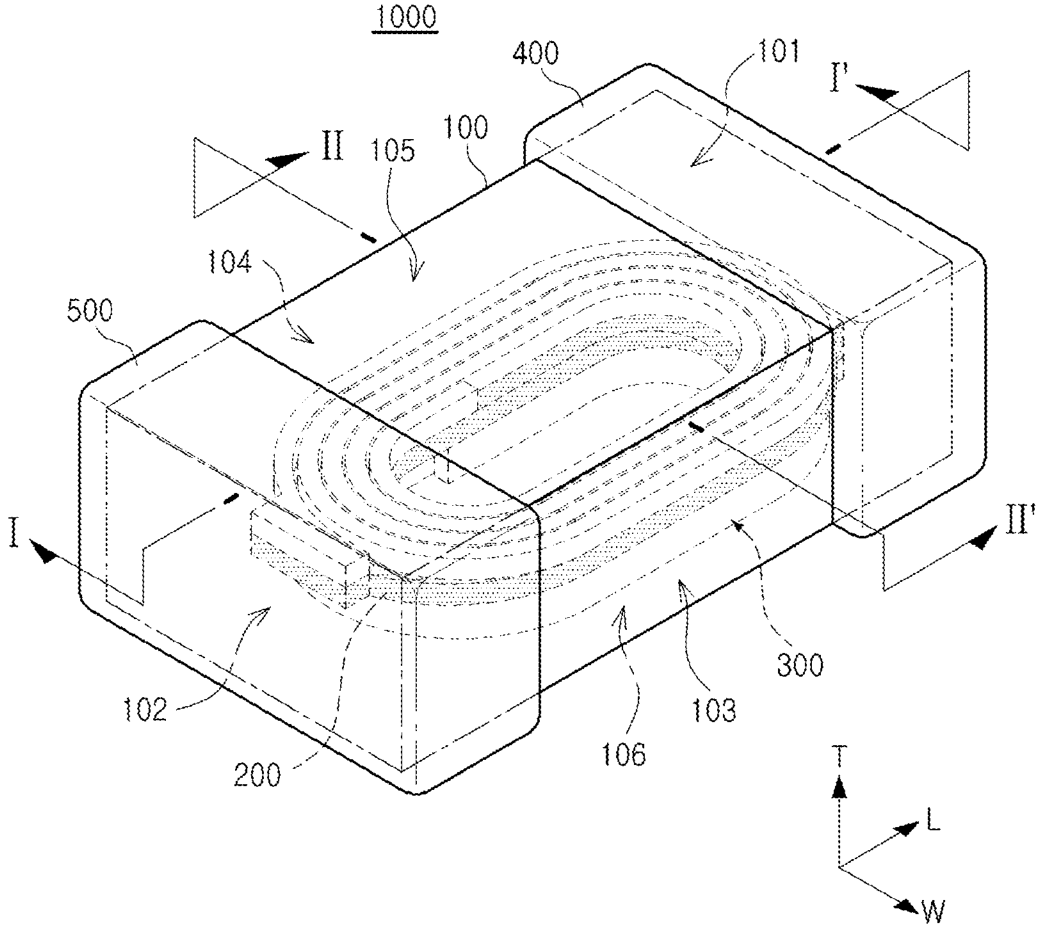
FIG. 1 is a view schematically illustrating a coil component according to an exemplary embodiment in the present disclosure.

Hereinafter, exemplary embodiments in the present disclosure will now be described in detail with reference to the accompanying drawings.

In the drawings, an L direction refers to a first direction or a length direction, a W direction refers to a second direction or a width direction, and a T direction refers to a third direction or a thickness direction.

Various kinds of electronic components may be used in an electronic device, and various kinds of coil components may be appropriately used between these electronic components for purposes such as noise removal.

That is, the coil components used in the electronic device may be a power inductor, a high frequency (HF) inductor, a general bead, a high frequency bead (GHz bead), a common mode filter, and the like.

Figure 2:
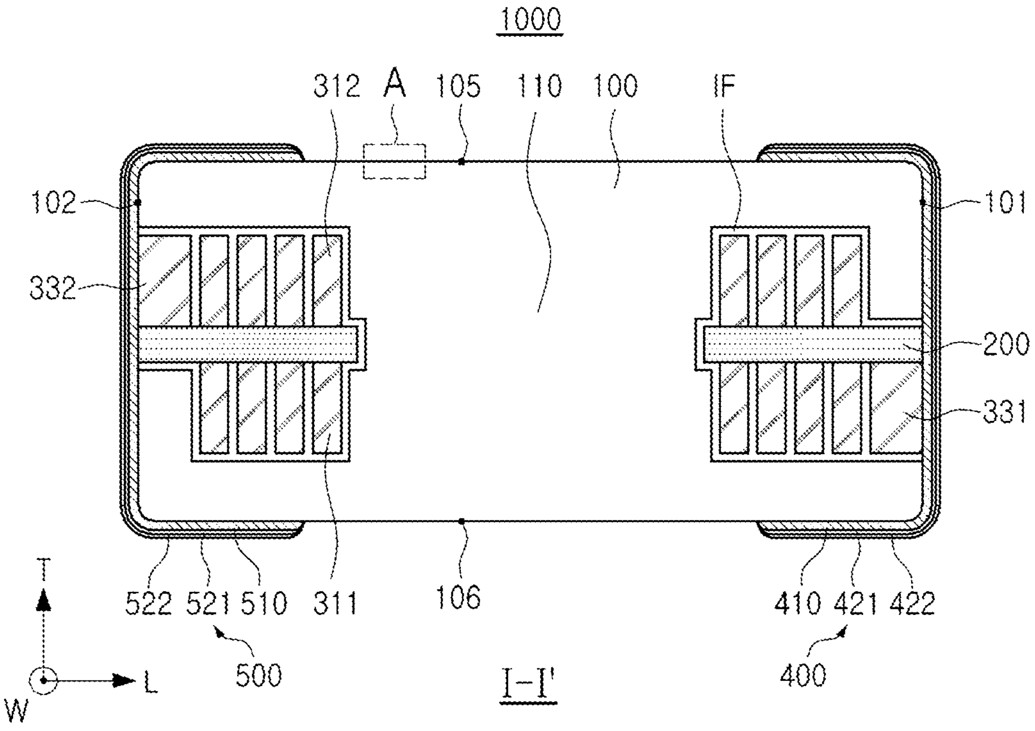
FIG. 2 is a cross-sectional view taken along line I-I' of FIG. 1.
Figure 3:
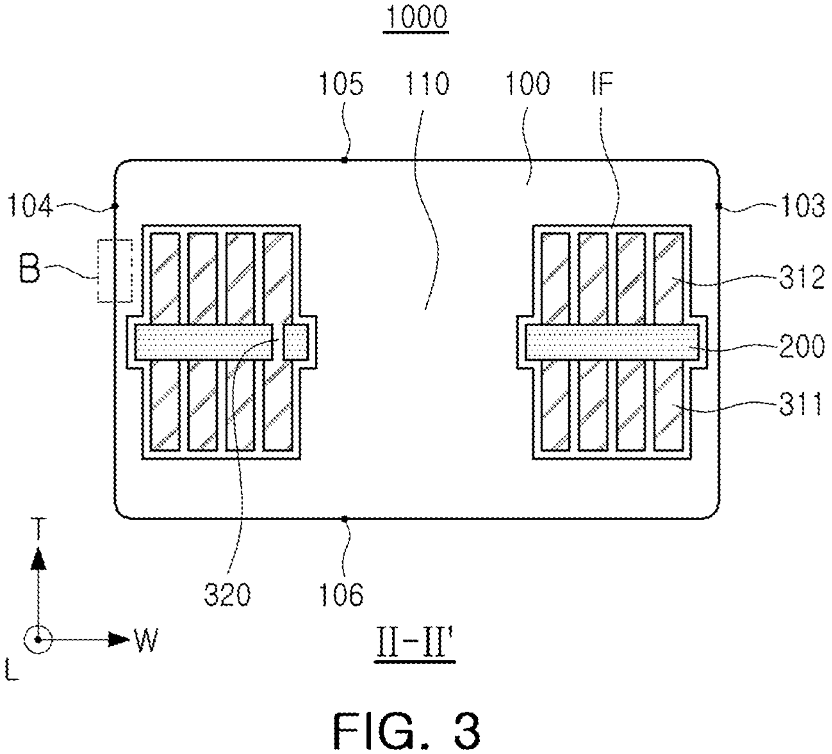
FIG. 3 is a cross-sectional view taken along line II-II' of FIG. 1.
Figure 4:
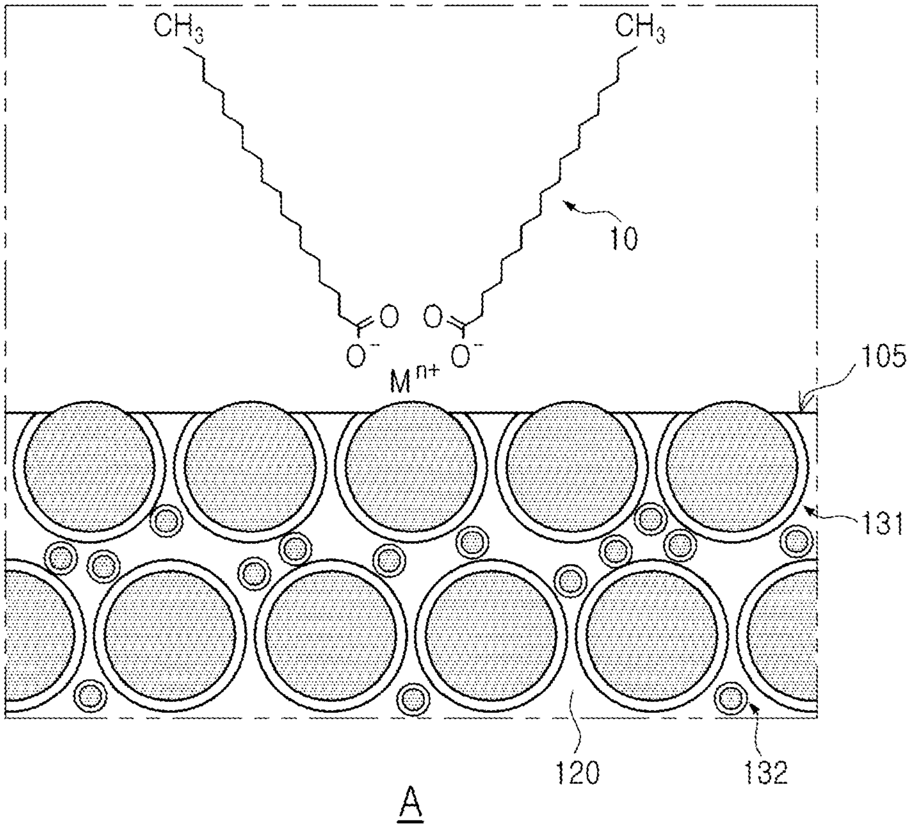
FIG. 4 is an enlarged view of a part A of FIG. 2.
Figure 5:
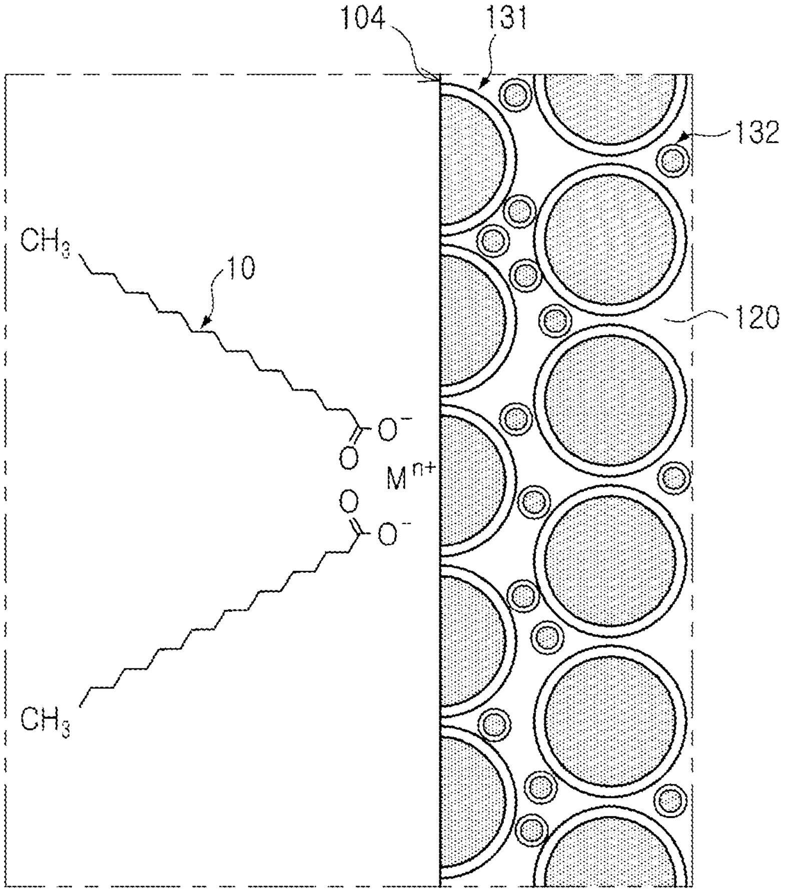
FIG. 5 is an enlarged view of a part B of FIG. 3.

FIG. 1 is a view schematically illustrating a coil component according to an exemplary embodiment in the present disclosure. FIG. 2 is a cross-sectional view taken along line I-I' of FIG. 1. FIG. 3 is a cross-sectional view taken along line II-II' of FIG. 1. FIG. 4 is an enlarged view of a part A of FIG. 2. FIG. 5 is an enlarged view of a part B of FIG. 3.

Referring to FIGS. 1 through 5, a coil component 1000 according to an exemplary embodiment in the present disclosure may include a body 100, an insulating substrate 200, a coil portion 300, external electrodes 400 and 500, and an insulating film IF.

The body 100 may form an appearance of the coil component 1000 according to the present exemplary embodiment, and the insulating substrate 200 and the coil portion 300 to be described later may be embedded in the body 100.

The body 100 may generally have a hexahedral shape.

The body 100 may have a first surface 101 and a second surface 102 opposing each other in the length direction L, a third surface 103 and a fourth surface 104 opposing each other in the width direction W, and a fifth surface 105 and a sixth surface 106 opposing each other in the thickness direction T in FIGS. 1 through 3. The first to fourth surfaces 101 to 104 of the body 100 may correspond to walls of the body 100 connecting the fifth and sixth surfaces 105 and 106 of the body 100 to each other. Hereinafter, opposite end surfaces (one end surface and the other end surface) of the body 100 may refer to the first and second surfaces 101 and 102 of the body 100, and opposite side surfaces (one side surface and the other side surface) of the body 100 may refer to the third and fourth surfaces 103 and 104 of the body 100. Further, one surface and the other surface of the body 100 may refer to the sixth and fifth surfaces 106 and 105 of the body 100, respectively. The sixth surface 106 of the body 100 may be used as a mounting surface when the coil component 1000 according to the present exemplary embodiment is mounted on a mounting insulating board such as a printed circuit board.

The entire surface (101, 102, 103, 104, 105, and 106) of the body 100 may have first and second regions in which the external electrodes 400 and 500 to be described later are disposed, respectively, and a third region in which the external electrodes 400 and 500 are not disposed. For example, as illustrated in FIGS. 1 through 3, the first region of the entire surface (101, 102, 103, 104, 105, and 106) of the body 100 may refer to a region in which the first external electrode 400 is disposed, that is, the entire first surface 101 of the body 100 and a portion of each of the third to sixth surfaces 103 to 106 of the body 100. The second region of the entire surface (101, 102, 103, 104, 105, and 106) of the body 100 may refer to a region in which the second external electrode 500 is disposed, that is, the entire second surface 102 of the body 100 and a portion of each of the third to sixth surfaces 103 to 106 of the body 100. The third region of the entire surface (101, 102, 103, 104, 105, and 106) of the body 100 may refer to a region in which each of the first and second external electrodes 400 and 500 is not disposed, that is, a portion of each of the third to sixth surfaces 103 to 106 of the body 100.

The body 100 may be formed so that the coil component 1000 according to the present exemplary embodiment in which the external electrodes 400 and 500 to be described later are formed has a length of 2.5 mm, a width of 2.0 mm, and a thickness of 1.0 mm, a length of 1.6 mm, a width of 0.8 mm, and a thickness of 0.8 mm, a length of 1.0 mm, a width of 0.5 mm, and a thickness of 0.5 mm, or a length of 0.8 mm, a width of 0.4 mm, and a thickness of 0.65 mm by way of example, but is not limited thereto. Meanwhile, since the above-described exemplary numerical values of the length, width, and thickness of the coil component 1000 refer to numerical values that do not reflect process errors, it should be considered that numerical values in an allowable process error range correspond to the above-described exemplary numerical values.

The length of the coil component 1000 described above may refer to the largest value among dimensions of a plurality of line segments that connect two outermost boundary lines of the coil component 1000 facing each other in the length direction L and are parallel to the length direction L, in an image of a cross section of a central portion of the coil component 1000 in the width direction W, the image being taken by an optical microscope or a scanning electron microscope (SEM), and the cross section being taken along the length direction L and the thickness direction T. Alternatively, the length of the coil component 1000 may refer to the smallest value among the dimensions of the plurality of line segments that connect two outermost boundary lines of the coil component 1000 facing each other in the length direction L and are parallel to the length direction L, in the image of the cross section. Alternatively, the length of the coil component 1000 may refer to an arithmetic means value of three or more dimensions of the plurality of line segments that connect two outermost boundary lines of the coil component 1000 facing each other in the length direction L and are parallel to the length direction L, in the image of the cross section. Here, the plurality of line segments parallel to the length direction L may be equally spaced apart from each other in the thickness direction T, but the scope of the present disclosure is not limited thereto.

The thickness of the coil component 1000 described above may refer to the largest value among dimensions of a plurality of line segments that connect two outermost boundary lines of the coil component 1000 facing each other in the thickness direction T and are parallel to the thickness direction T, in the image of the cross section of the central portion of the coil component 1000 in the width direction W, the image being taken by an optical microscope or a scanning electron microscope (SEM), and the cross section being taken along the length direction L and the thickness direction T. Alternatively, the thickness of the coil component 1000 may refer to the smallest value among the dimensions of the plurality of line segments that connect two outermost boundary lines of the coil component 1000 facing each other in the thickness direction T and are parallel to the thickness direction T, in the image of the cross section. Alternatively, the thickness of the coil component 1000 may refer to an arithmetic means value of three or more dimensions of the plurality of line segments that connect two outermost boundary lines of the coil component 1000 facing each other in the thickness direction T and are parallel to the thickness direction T, in the image of the cross section. Here, the plurality of line segments parallel to the thickness direction T may be equally spaced apart from each other in the length direction L, but the scope of the present disclosure is not limited thereto.

The width of the coil component 1000 described above may refer to the largest value among dimensions of a plurality of line segments that connect two outermost boundary lines of the coil component 1000 facing each other in the width direction W and are parallel to the width direction W, in an image of a cross section of a central portion of the coil component 1000 in the thickness direction T, the image being taken by an optical microscope or a scanning electron microscope (SEM), and the cross section being taken along the length direction L and the width direction W. Alternatively, the width of the coil component 1000 may refer to the smallest value among the dimensions of the plurality of line segments that connect two outermost boundary lines of the coil component 1000 facing each other in the width direction W and are parallel to the width direction W, in the image of the cross section. Alternatively, the width of the coil component 1000 may refer to an arithmetic means value of three or more dimensions of the plurality of line segments that connect two outermost boundary lines of the coil component 1000 facing each other in the width direction W and are parallel to the width direction W, in the image of the cross section. Here, the plurality of line segments parallel to the width direction W may be equally spaced apart from each other in the length direction L, but the scope of the present disclosure is not limited thereto.

Alternatively, each of the length, the width, and the thickness of the coil component 1000 may be measured by a micrometer measurement method. According to the micrometer measurement method, measurement may be performed by zeroing a micrometer subjected to gage repeatability and reproducibility (R&R), inserting the coil component 1000 according to the present exemplary embodiment between tips of the micrometer, and turning a measurement lever of the micrometer. Meanwhile, when measuring the length of the coil component 1000 by the micrometer measurement method, the length of the coil component 1000 may refer to a value obtained by performing the measurement once, or an arithmetic mean of values obtained by performing the measurement multiple times. The same may apply to the width and the thickness of the coil component 1000.

The body 100 may include a core 110 penetrating through a central portion of each of the insulating substrate 200 and the coil portion 300 to be described later. The core 110 may be formed by filling a through-hole penetrating through the central portion of each of the coil portion 300 and the insulating substrate 200 with a magnetic composite sheet, but is not limited thereto.

The body 100 may contain an insulating resin 110 and magnetic metal particles 131 and 132. For example, the body 100 may be formed by stacking one or more magnetic composite sheets containing the insulating resin 110 and the magnetic metal particles 131 and 132 dispersed in the insulating resin 110.

The insulating resin 110 may include epoxy, polyimide, liquid crystal polymer (LCP), or the like, or mixtures thereof, but is not limited thereto.

The magnetic metal particles 131 and 132 may each include one or more selected from the group consisting of iron (Fe), silicon (Si), chromium (Cr), cobalt (Co), molybdenum (Mo), aluminum (Al), niobium (Nb), copper (Cu), boron (B), and nickel (Ni). For example, the magnetic metal particles 131 and 132 may be at least one of pure iron particles, Fe—Si-based alloy particles, Fe—Si—Al-based alloy particles, Fe—Ni-based alloy particles, Fe—Ni—Mo-based alloy particles, Fe—Ni—Mo—Cu-based alloy particles, Fe—Co-based alloy particles, Fe—Ni—Co-based alloy particles, Fe—Cr-based alloy particles, Fe—Cr—Si-based alloy particles, Fe—Si—Cu—Nb-based alloy particles, Fe—Ni—Cr-based alloy particles, or Fe—Cr—Al-based alloy particles.

The magnetic metal particles 131 and 132 may each be amorphous or crystalline. For example, the magnetic metal particles 131 and 132 may be Fe—Si—B—Cr based amorphous alloy particles, but are not necessarily limited thereto. The magnetic metal particles 131 and 132 may each have an average diameter of about 0.1 μm to 30 μm, but are not limited thereto.

The magnetic metal particles 131 and 132 may include a first particle 131 and a second particle 132 having a smaller particle size than the first particle 131. In the present specification, the particle size or average diameter may mean particle size distribution expressed as $D_{90}$, $D_{50}$, or the like. According to the present disclosure, since the magnetic metal particles 131 and 132 include the first particle 131 and the second particle 132 having a smaller particle size than the first particle 131, the second particle 132 may be disposed in a space between the first particles 131, and as a result, a volume proportion of a magnetic material in the body 100 may be increased with respect to the same volume of the body 100. Meanwhile, in the following description, for convenience of explanation, it is assumed that the magnetic metal particles 131 and 132 of the body 100 include the first particle 131 and the second particle 132 having different particle sizes. However, the scope of the present disclosure is not limited thereto. As another non-limitative example in the present disclosure, the magnetic metal particles may include three or more types of particles having different particle sizes.

An insulating coating layer may be formed on a surface of each of the magnetic metal particles 131 and 132. Specifically, the first particle 131 may include a conductive first core particle and a first insulating coating layer with which at least a portion of a surface of the first core particle is coated. The second particle 132 may include a conductive second core particle and a second insulating coating layer with which at least a portion of a surface of the second core particle is coated. For example, the insulating coating layer may be an organic film containing epoxy, polyimide, liquid crystal polymer (LCP), or the like, or mixtures thereof, an inorganic film containing silica ($SiO_2$) or alumina ($Al_2O_3$), or a metal oxide film containing a metal. Here, in a case in which the insulating coating layer is a metal oxide film, the metal oxide film may contain metal elements of the magnetic metal particles 131 and 132, but the scope of the present disclosure is not limited thereto. The metal oxide film may contain a metal element other than the metal elements included in the core particles of the magnetic metal particles 131 and 132.

The magnetic metal particles 131 and 132 may be exposed to each of the first to sixth surfaces 101 to 106 of the body 100.

Exposed surfaces of the magnetic metal particles 131 and 132 exposed to each of the first to fourth surfaces 101 to 104 of the body 100 may each have a cut surface substantially parallel to the first to fourth surfaces 101 to 104 of the body 100. Generally, in a case of the coil component, a coil bar in which a plurality of bodies are connected to each other is manufactured by forming a coil substrate in which a plurality of coil portions are connected to each other on a large-area insulating substrate, and stacking and curing magnetic composite sheets containing magnetic metal particles and an insulating resin on the coil substrate, and dicing is performed along dicing lines that are parallel to the length direction L and the width direction W of individual components, thereby separating the bodies of the plurality of components. Among the magnetic metal particles, those disposed on the dicing lines are cut by a dicing saw during the dicing. Accordingly, according to the present exemplary embodiment, the exposed surfaces of the magnetic metal particles 131 and 132 exposed to the first to fourth surfaces 101 to 104 of the body 100 opposing each other in the length direction L and the width direction W may each have the cut surface substantially parallel to the first to fourth surfaces 101 to 104 of the body 100. For example, referring to FIG. 5, the first magnetic metal particle 131 exposed to the fourth surface 104 of the body 100 may have the cut surface, and the cut surface of the first magnetic metal particle 131 exposed to the fourth surface 104 of the body 100 may be substantially parallel to the fourth surface 104 of the body 100. Further, referring to FIG. 5, the cut surface of the first magnetic metal particle 131 exposed to the fourth surface 104 of the body 100 may be coplanar with the fourth surface 104 of the body 100. The cut surface of the first magnetic metal particle 131 exposed to the fourth surface 104 of the body 100 may be a surface obtained by cutting the first core particle and the first insulating coating layer of the first magnetic metal particle 131 together. As a result, as the cut surface of the first magnetic metal particle 131, the first core particle of the first magnetic metal particle 131 may be exposed to the fourth surface 104 of the body 100, and a metal component of the first magnetic metal particle 131 may be exposed to the fourth surface 104 of the body 100. Meanwhile, in FIG. 5, only the first magnetic metal particle 131 is exposed to the fourth surface 104 of the body 100 and the first magnetic metal particle 131 is illustrated as having the cut surface, but this is only an exemplary matter, and the second magnetic metal particle 132 may also be exposed to the fourth surface 104 of the body 100 and have the cut surface. In addition, the above-described contents of the fourth surface 104 of the body 100 and the magnetic metal particles 131 and 132 exposed to the fourth surface 104 of the body 100 may also be applied to each of the first surface 101 of the body 100 and the magnetic metal particles 131 and 132 exposed to the first surface 101 of the body 100, the second surface 102 of the body 100 and the magnetic metal particles 131 and 132 exposed to the second surface 102 of the body 100, and the third surface 103 of the body 100 and the magnetic metal particles 131 and 132 exposed to the third surface 103 of the body 100.

Portions of the insulating coating layers that are disposed at the exposed surfaces of the magnetic metal particles 131 and 132 exposed to each of the fifth and sixth surfaces 105 and 106 of the body 100 may be removed to expose the core particles. In general, in a subsequent process after the above-described dicing, upper and lower surfaces of the individual body are exposed to external chemical and/or physical factors. Therefore, according to the present disclosure, portions of the insulating coating layers that are disposed at the exposed surfaces of the magnetic metal particles 131 and 132 exposed to the fifth and sixth surfaces 105 and 106 of the body 100 opposing each other in the thickness direction T may be removed. For example, referring to FIG. 4, a portion of the insulating coating layer at an exposed portion of the first magnetic metal particle 131 exposed to the fifth surface 105 of the body 100 may be removed. Meanwhile, in FIG. 4, only the first magnetic metal particle 131 is exposed to the fifth surface 105 of the body 100 and a portion of the insulating coating layer is removed, but this is only an exemplary matter, and the second magnetic metal particle 132 may also be exposed to the fifth surface 105 of the body 100. Further, in FIG. 4, portions of the insulating coating layers of all the first magnetic metal particles 131 exposed to the fifth surface 105 of the body 100 are removed, but this is only an exemplary matter, and a case in which the insulating coating layers of some of the exposed first magnetic metal particles 131 are not removed also falls within the scope of the present disclosure. In addition, the above-described contents of the fifth surface 105 of the body 100 and the magnetic metal particles 131 and 132 exposed to the fifth surface 105 of the body 100 may also be applied to each of the sixth surface 106 of the body 100 and the magnetic metal particles 131 and 132 exposed to the sixth surface 106 of the body 100.

As a result, according to the present exemplary embodiment, the magnetic metal particles 131 and 132 may be exposed to a portion of each of the third to sixth surfaces 103 to 106 of the body 100, which corresponds to the third region of the entire surface (101, 102, 103, 104, 105, and 106) of the body 100. The core particles of the magnetic metal particles 131 and 132 may be exposed at the exposed surfaces of the magnetic metal particles 131 and 132 exposed to each of the third to sixth surfaces 103 to 106 of the body 100 as described above.

A monomolecular organic material 10 may be disposed on the exposed surfaces of the magnetic metal particles 131 and 132 in the third region of the body 100. The monomolecular organic material 10 may have a hydrophobic portion and a hydrophilic portion, and the hydrophilic portion is directed toward the exposed surfaces of the magnetic metal particles 131 and 132. That is, the monomolecular organic material 10 may be a surfactant. The hydrophilic portion of the monomolecular organic material 10 may have a negative charge at the end of the hydrophilic portion that binds with a metal cation ($M^{n+}$) present at the exposed surfaces of the magnetic metal particles 131 and 132. Accordingly, the monomolecular organic material may be formed using an anionic surfactant and/or an amphoteric surfactant. For example, the hydrophilic portion having the negative charge of the monomolecular organic material 10 may have at least one of negatively charged structures of a s carboxylate group ($COO^-$), a sulfonate group ($SO_3^-$), or a phosphate group ($PO_4^{3-}$). Meanwhile, in the present specification, the monomolecular organic material 10 may mean a monomer that has not undergone polymerization. In addition, the monomolecular organic material 10 may mean an organic material having a molecular weight of 100 or more and 500 or less. Meanwhile, in a case in which the molecular weight of the monomolecular organic material 10 is less than 100, since a length of the hydrophobic portion is small, hydrophobicity of the hydrophobic portion of the monomolecular organic material 10 may be lowered, and as a result, plating bleeding may occur during plating which is a subsequent process. In a case in which the molecular weight of the monomolecular organic material 10 exceeds 500, it may be difficult to dissolve the monomolecular organic material in a treatment solution used in a process for forming the monomolecular organic material 10 on the surface of the body 100. Further, in a case in which the molecular weight of the monomolecular organic material 10 exceeds 500, the monomolecular organic material 10 may be adhered to conductive resin layers 410 and 510 of the external electrodes 400 and 500, and thus, it may be difficult for the first metal layers 421 and 521 formed in the plating which is a subsequent process to be formed on the conductive resin layers 410 and 510, or the first metal layers 421 and 521 formed on the conductive resin layers 410 and 510 may be easily peeled off.

A process of disposing the monomolecular organic material 10 on the body 100 may be performed after forming the conductive resin layers 410 and 520 of the external electrodes 400 and 500 to be described later in the first and second regions of the body 100 to expose only the third region of the body 100 to the outside. Accordingly, the monomolecular organic material 10 may not be disposed in the first and second regions of the surface of the body 100, but may be disposed only in the third region of the surface of the body 100.

The metal cation ($M^{n+}$) present at the exposed surfaces of the magnetic metal particles 131 and 132 may be derived from, for example, the core particles of the magnetic metal particles 131 and 132, or may be derived from other than the core particles. In the former case, for example, the metal cation ($M^{n+}$) may be derived from the core particles as the surface of the body 100 is subjected to pickling treatment, and the metal cation ($M^{n+}$) present at the exposed surfaces of the magnetic metal particles 131 and 132 may include an iron ion ($Fe^{2+}$ or $Fe^{3+}$). In the latter case, for example, the metal cation ($M^{n+}$) may be derived from other than the core particles as the surface of the body 100 is subjected to chemical conversion treatment using phosphate or the like, and the metal cation ($M^{n+}$) present at the exposed surfaces of the magnetic metal particles 131 and 132 may include a manganese ion ($Mg^{2+}$) and/or a zinc ion ($Zn^{2+}$) derived from phosphate. Meanwhile, in a case in which both the pickling treatment and the phosphate treatment are performed on the body 100, the iron ion ($Fe^{2+}$ or $Fe^{3+}$) and at least one of the manganese ion ($Mg^{2+}$) or the zinc ion ($Zn^{2+}$) may be present at each of the exposed surfaces of the magnetic metal particles 131 and 132.

Meanwhile, in FIGS. 4 and 5, the monomolecular organic material 10 according to the present exemplary embodiment is combined with the metal cation ($M^{n+}$) to form stearate, but is not limited thereto. As another example, the monomolecular organic material 10 may be combined with the metal cation ($M^{n+}$) to form at least one of alkylbenzene sulfonate, alkyl sulfonate, alkyl sulfate, salts of a fluorinated fatty acid, fatty alcohol sulfate, α-olefin sulfonate, alkyl alcohol amide, alkyl sulfonic acid acetamide, alkyl succinate sulfonate salts, amino alcohol alkylbenzene sulfonate, naphthenate, alkylphenol sulfonate, naphthalene sulfonate, or naphthalene carboxylate.

The fact that the monomolecular organic material 10 is in the third region of the surface of the body 100 or that the monomolecular organic material 10 is in a region of the surface of the body 100 where the magnetic metal particles 131 and 132 are exposed may be observed by chromatography in which a material is identified based on a difference in mobility of the material. The chromatography may be liquid chromatography (LC) or gas chromatography (GC). That is, when the third region of the surface of the body is immersed in an organic solvent containing at least one of ethyl alcohol, isopropyl alcohol (IPA), or benzene, the monomolecular organic material 10 is dissolved and extracted in the organic solvent, and the monomolecular organic material 10 may be quantitatively analyzed and qualitatively analyzed by performing the chromatography on such an organic solvent.

In a case of a general coil component, the conductive magnetic metal particles are exposed to the surface of the individual body due to the above-described dicing or the like. When the magnetic metal particles are exposed to the surface of the body, during plating in a process of forming the external electrode, a plating layer may be formed on not only in a region of the surface of the body where the external electrode is intended to be formed but also in other regions. That is, metal ions contained in a plating solution may be formed without selectivity on the entire surface of the body due to the conductive magnetic metal particles exposed to the surface of the body. To prevent such a problem, in a case of a coil component according to the related art, it has been necessary to add a process of selectively forming a surface insulating layer in a region of the surface of the body except for a region in which the external electrode is to be formed before performing plating for forming the external electrode. However, in order to selectively form the surface insulating layer on the surface of the body, it is necessary to remove only a region of the surface insulating layer that corresponds to the region for forming the external electrode after forming the surface insulating layer on the entire surface of the body, or it is necessary to selectively form the surface insulating layer at a portion of the surface of the body. In the former case, there may be a problem in that alignment of individual bodies becomes very difficult due to a reduction in weight, thickness, and size of the component. In the latter case, since the process of selectively forming the surface insulating layer needs to be performed individually for each component, there may be a problem with productivity. In addition, since the surface insulating layer according to the related art is formed by applying and curing a resin paste or stacking and curing insulating resin films, a thickness of the surface insulating layer is relatively large, which may reduce an effective volume of a magnetic material with respect to the same size of the component.

According to the present exemplary embodiment, the above-described problems of the related art may be solved by disposing the monomolecular organic material 10 having the hydrophobic portion on the exposed surfaces of the magnetic metal particles 131 and 132 exposed to the third region of the body 100. Since the monomolecular organic material 10 is present at the exposed surfaces of the magnetic metal particles 131 and 132 and has the hydrophobic portion, reactivity with the plating solution used for plating and a metal ion of the plating solution is significantly reduced. Therefore, according to the present exemplary embodiment, the above-described plating bleeding problem that may occur along the exposed surfaces of the magnetic metal particles 131 and 132 may be suppressed. In addition, according to the present exemplary embodiment, since the above-described plating bleeding may be prevented only with the monomolecular organic material 10, a thickness of a component having a plating stop function may be significantly reduced, unlike the surface insulating layer according to the related art. As a result, the effective volume of the magnetic material with respect to the same size of the component may be increased. In addition, in the present exemplary embodiment, since the plating bleeding may be prevented only by the process of forming the monomolecular organic material 10, the above-descried problems such as a difficulty in alignment of the individual bodies caused by the reduction in weight, thickness, and size of the component according to the related art, and deteriorations in productivity caused because the process for forming the surface insulating layer on the body of each component is individually performed may be effectively prevented. For example, in a case of performing a process of forming the monomolecular organic material 10 after forming the conductive resin layers 410 and 510 of the external electrodes 400 and 500 in the first and second regions of the body 100, conductive particles such as silver (Ag) and/or copper (Cu) contained in the conductive resin layers 410 and 510 may have a relatively low reactivity with an acidic solution used for the above-described pickling treatment and phosphate treatment, and thus, even after the pickling treatment and phosphate treatment are performed, the metal cation may not exist at exposed surfaces of the conductive resin layers 410 and 510 of the external electrodes 400 and 500. As a result, the body 100 that has undergone the pickling treatment and the phosphate treatment may partially have a positive charge only the third region of the surface of the body 100. Since the hydrophilic portion of the monomolecular organic material 10 has an anion, the monomolecular organic material 10 may be disposed with high selectivity only in the third region of the surface of the body 100 having a positive charge. As a result, components for preventing plating bleeding may be collectively disposed on surfaces of a plurality of bodies, thereby improving productivity.

A concentration of the treatment solution for forming the monomolecular organic material 10 may be 0.001 g/L to 10 g/L. Preferably, the concentration of the treatment solution may be 0.1 g/L to 2 g/L. In a case in which the concentration of the treatment solution is less than 0.001 g/L, the monomolecular organic material 10 may be non-uniformly present on the surface of the body 100. In a case in which the concentration of the treatment solution exceeds 10 g/L, the monomolecular organic material 10 may not be sufficiently dissolved in the solvent, and the monomolecular organic material 10 may be present on the surface of the body 100 more than necessary. As a result, it may be difficult to form the metal layers 421 and 521 and 422 and 522 of the external electrodes 400 and 500 on the conductive resin layer 410 by plating.

Since a plurality of magnetic metal particles 131 and 132 are exposed to the third region of the surface of the body 100, that is, each of the third to sixth surfaces 103 to 106 of the body 100, while being spaced apart from each other, the monomolecular organic material 10 may be present at each of the exposed surfaces of the plurality of magnetic metal particles 131 and 132. For example, the plurality of magnetic metal particles 131 and 132 may be exposed to the third surface 103 of the body 100 while being spaced apart from each other, and the monomolecular organic material 10 may be disposed at a plurality of exposed surfaces of the magnetic metal particles 131 and 132. As a result, the monomolecular organic material 10 may be present in the form of an island on any one surface of the body 100, but the scope of the present disclosure is not limited thereto.

The monomolecular organic material 10 may further be present at at least a portion of an insulating resin 120 forming the third region of the body 100. Accordingly, the monomolecular organic material 10 may be disposed not only at the exposed surfaces of the magnetic metal particles 131 and 132, but also at an exposed surface of the insulating layer 120 in a region of the fifth surface 105 of the body 100 where the first and second external electrodes 400 and 500 are not formed. In a surface treatment process for forming the monomolecular organic material 10, the monomolecular organic material 10 may also be combined with the insulating resin 120 depending on a process time, the surface treatment solution, and the like.

The insulating substrate 200 may be embedded in the body 100. The insulating substrate 200 may be a component supporting the coil portion 300 to be described later.

The insulating substrate 200 may be formed of an insulating material including at least one of a thermosetting insulating resin such as an epoxy resin, a thermoplastic insulating resin such as a polyimide resin, or a photosensitive insulating resin. Alternatively, the insulating substrate 200 may be formed of an insulating material having a reinforcement material such as a glass fiber or an inorganic filler impregnated in the at least one resin described above. As an example, the insulating substrate 200 may be formed of an insulating material such as prepreg, an Ajinomoto Build-up Film (ABF), FR-4, a Bismaleimide Triazine (BT) resin, a photoimagable dielectric (PID), or the like, but is not limited thereto.

As the inorganic filler, at least one selected from the group consisting of silica ($SiO_2$), alumina ($Al_2O_3$), silicon carbide (SiC), barium sulfate ($BaSO_4$), talc, clay, mica powders, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

In a case in which the insulating substrate 200 is formed of the insulating material including the reinforcement material, the insulating substrate 200 may provide more excellent rigidity. In a case in which the insulating substrate 200 is formed of an insulating material that does not include a glass fiber, the insulating substrate 200 may be advantageous in decreasing the thickness of the entire coil portion 300. In a case in which the insulating substrate 200 is formed of the insulating material including the photosensitive insulating resin, the number of processes for forming the coil portion 300 may be decreased, which is advantageous in decreasing a production cost and forming a fine via.

The coil portion 300 may be disposed in the body 100, and may implement the characteristic of the coil component. For example, in a case in which the coil component 1000 according to the present exemplary embodiment is used as a power inductor, the coil portion 300 may serve to store an electric field as a magnetic field to maintain an output voltage, thereby stabilizing power of an electronic device.

The coil portion 300 may include coil patterns 311 and 312, a via 320, and lead-out patterns 331 and 332. Specifically, in the coil portion 300, in the direction in FIGS. 1 through 3, the first coil pattern 311 and the first lead-out pattern 331 may be disposed on a lower surface of the insulating substrate 200 that faces the sixth surface 106 of the body 100, and the second coil pattern 312 and the second lead-out pattern 332 may be disposed on an upper surface of the insulating substrate 200 that opposes the lower surface of the insulating substrate 200. The via 320 may penetrate through the insulating substrate 200 and be in contact with an inner end portion of each of the first coil pattern 311 and the second coil pattern 312. The first and second lead-out patterns 331 and 332 may be exposed to the first and second surfaces 101 and 102 of the body 100 and connected to the first and second external electrodes 400 and 500 to be described below, respectively. Therefore, the coil portion 300 may function as one coil as a whole between the first and second external electrodes 400 and 500.

Each of the first coil pattern 311 and the second coil pattern 312 may have a planar spiral shape forming at least one turn around the core 110. As an example, the first coil pattern 311 may form at least one turn around the core 110 on the lower surface of the insulating substrate 200.

The first and second lead-out patterns 331 and 332 may be exposed to the first and second surfaces 101 and 102 of the body 100, respectively. Specifically, the first lead-out pattern 331 may be exposed to the first surface 101 of the body 100, and the second lead-out pattern 332 may be exposed to the second surface 102 of the body 100.

At least one of the coil patterns 311 and 312, the via 320, and the lead-out patterns 331 and 332 may include at least one conductive layer.

As an example, in a case in which the second coil pattern 312, the via 320, and the second lead-out pattern 332 are formed on the upper surface of the insulating substrate 200 by plating, each of the second coil pattern 312, the via 320, and the second lead pattern 332 may include a seed layer and an electroplating layer. Here, the electroplating layer may have a single-layer structure or have a multilayer structure. The electroplating layer having the multilayer structure may be formed in a conformal film structure in which one electroplating layer is formed along a surface of another electroplating layer, or may be formed in a shape in which one electroplating layer is stacked on only one surface of another electroplating layer. The seed layer may be formed by an electroless plating method or a vapor deposition method such as sputtering. The respective seed layers of the second coil pattern 312, the via 320, and the second lead-out pattern 332 may be formed integrally with each other, such that a boundary is not formed therebetween. However, the seed layers are not limited thereto. The respective electroplating layers of the second coil pattern 312, the via 320, and the second lead-out pattern 332 may be formed integrally with each other, such that a boundary is not formed therebetween. However, the electroplating layers are not limited thereto.

The coil patterns 311 and 312, the via 330, and the lead-out patterns 331 and 332 may each be formed of or comprise a conductive material such as copper (Cu), aluminum (Al), silver (Ag), tin (Sn), gold (Au), nickel (Ni), lead (Pb), titanium (Ti), chromium (Cr), or alloys thereof, but are not limited thereto.

The external electrodes 400 and 500 may be disposed on the body 100 while being spaced apart from each other, and may each be connected to the coil portion 300. Specifically, the first external electrode 400 may be disposed on the first surface 101 of the body 100 and may be in contact with the first lead-out pattern 331 of the coil portion 300 that is exposed to the first surface 101 of the body 100, and the second external electrode 500 may be disposed on the second surface 102 of the body 100 and may be in contact with the second lead-out pattern 332 of the coil portion 300 that is exposed to the second surface 102 of the body 100.

The first external electrode 400 may include the conductive resin layer 410, the first metal layer 421, and the second metal layer 422, and the second external electrode 500 may include the conductive resin layer 510, the first metal layer 521, and the second metal layer 522, the conductive resin layers 410 and 510 being in contact with the first and second regions of the body 100, respectively, the first metal layers 421 and 521 being disposed on the conductive resin layers 410 and 510, respectively, and the second metal layers 422 and 522 being disposed on the first metal layers. The conductive resin layers 410 and 510 may be formed by applying and curing a conductive paste in which conductive particles including at least one of silver (Ag) or copper (Cu) are dispersed in a resin such as an epoxy resin in the first and second regions of the body 100. The first metal layers 421 and 521 may be nickel (Ni) plating layers formed by electroplating. The second metal layers 422 and 522 may be tin (Sn) plating layers formed by electroplating. Meanwhile, as described above, in a case in which the monomolecular organic material 10 is formed after the conductive resin layers 410 and 510 are formed, the first and metal layers 421 and the second metal layers 521 and 422 and 522 formed by electroplating may be sequentially formed on the conductive resin layers 410 and 510 with relatively high selectivity.

The insulating film IF may be provided in order to insulate the coil portion 300 from the body 100, and may contain any known insulating material such as parylene. Any insulating material may be contained in the insulating film IF, and there is no particular limitation. The insulating film IF may be formed by a method such as vapor deposition, but is not limited thereto, and may also be formed by stacking insulating films on opposite surfaces of the insulating substrate 200.

Figure 6:
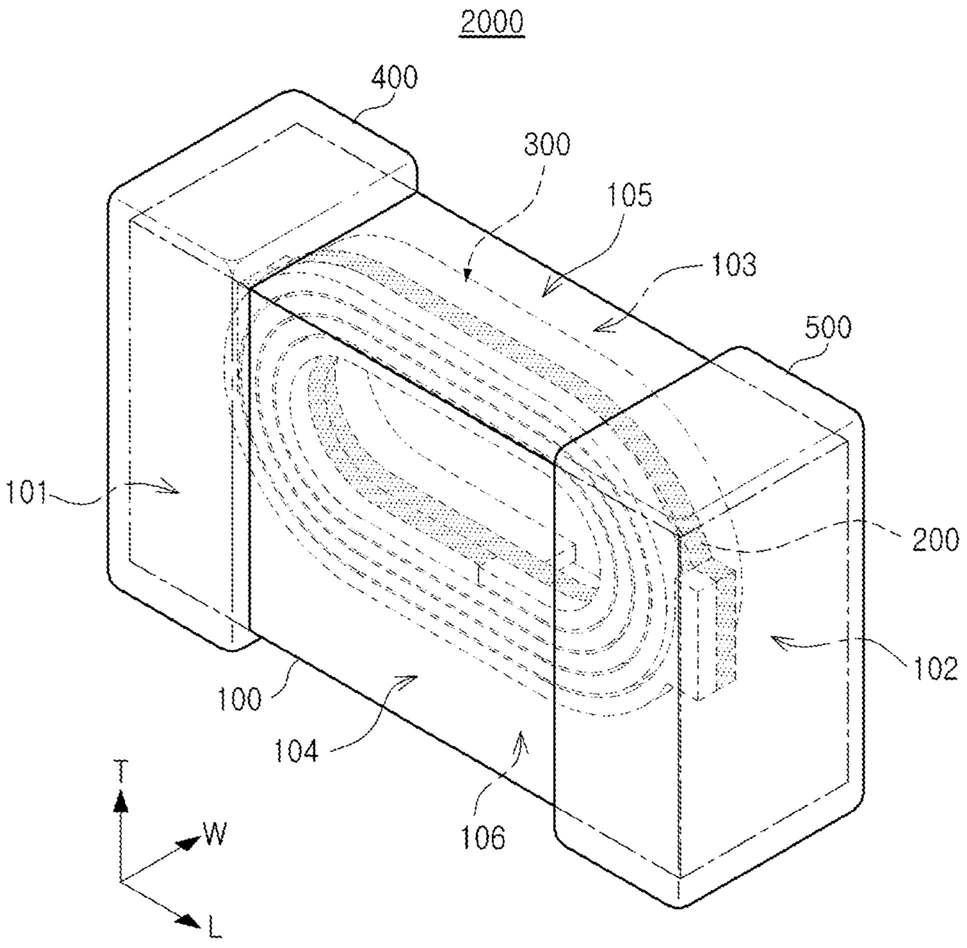
FIG. 6 is a view schematically illustrating a coil component according to another exemplary embodiment in the present disclosure.
Figure 7:
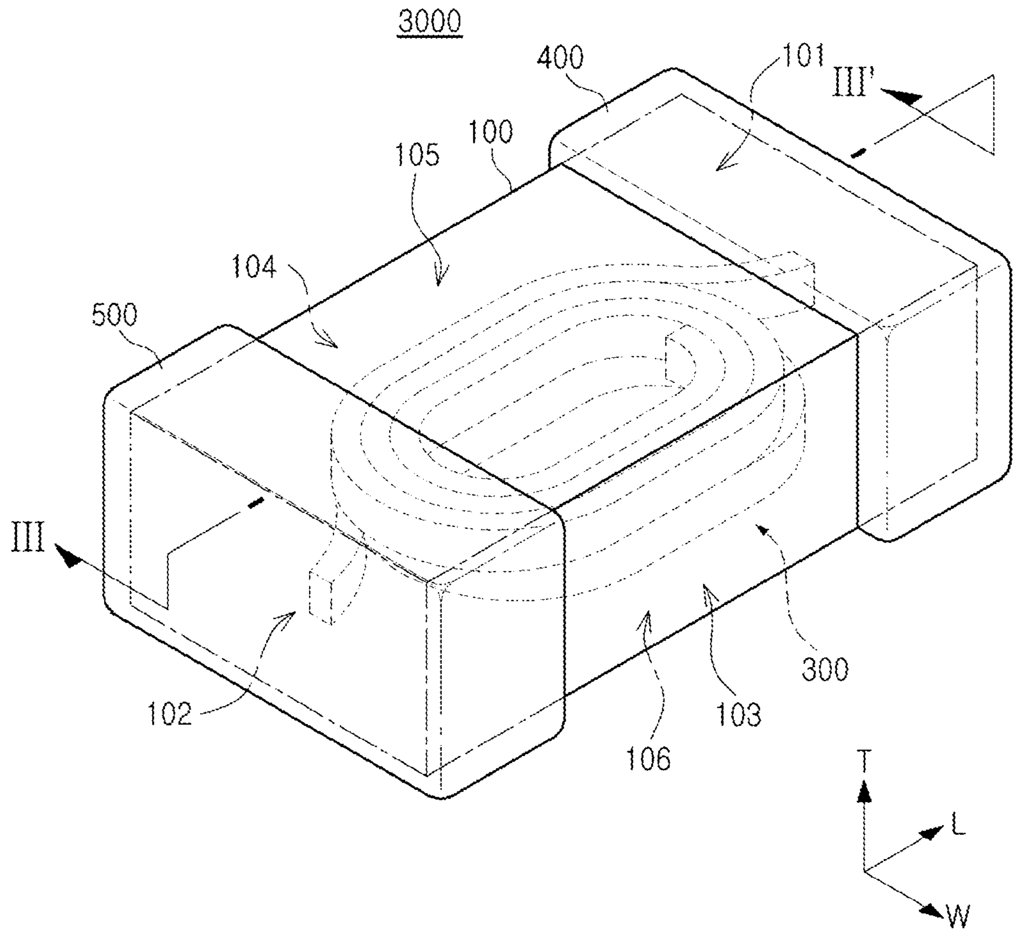
FIG. 7 is a view schematically illustrating a coil component according to another exemplary embodiment in the present disclosure.
Figure 8:
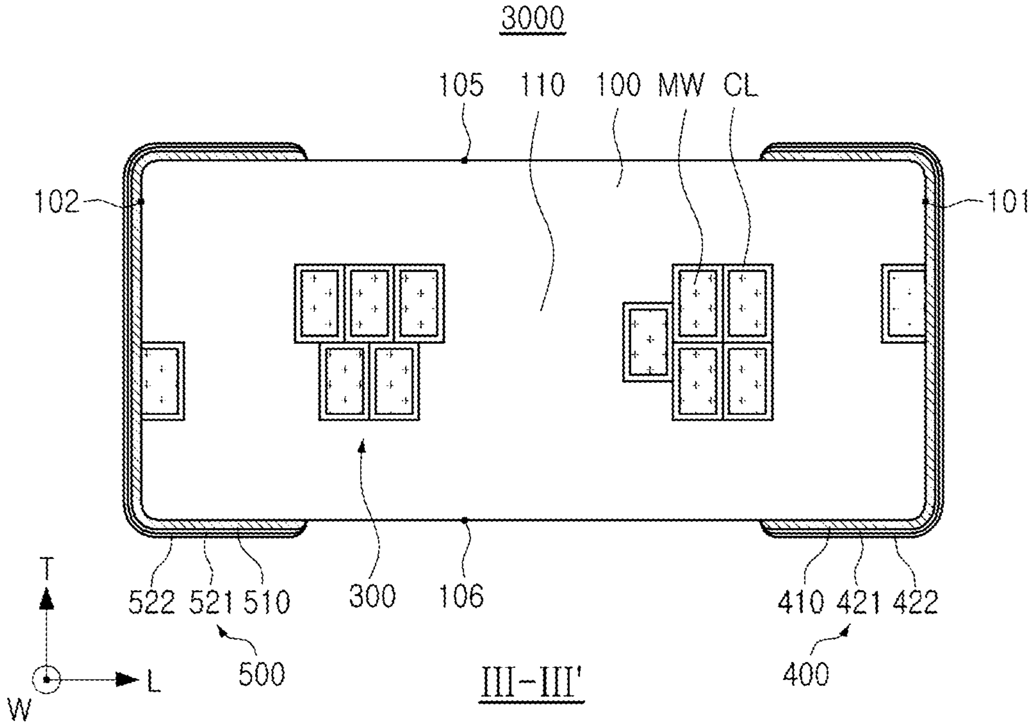
FIG. 8 is a cross-sectional view taken along line of FIG. 7.

FIG. 6 is a view schematically illustrating a coil component according to another exemplary embodiment in the present disclosure. FIG. 7 is a view schematically illustrating a coil component according to another exemplary embodiment in the present disclosure. FIG. 8 is a cross-sectional view taken along line III-III' of FIG. 7.

Referring to FIGS. 1 through 5, 6, and 7, coil components 2000 and 3000 according to other exemplary embodiments in the present disclosure are different from the coil component 1000 according to an exemplary embodiment in the present disclosure in regard to a coil portion 300. Therefore, in describing other exemplary embodiments in the present disclosure, only the coil portion 300 different from that of an exemplary embodiment in the present disclosure will be described. For the rest of the configurations of other exemplary embodiments in the present disclosure, the description in an exemplary embodiment in the present disclosure may be applied as it is.

Referring to FIG. 6, each of an insulating substrate 200 and the coil portion 300 applied to the coil component 2000 according to another exemplary embodiment in the present disclosure may be disposed perpendicular to a sixth surface 106 of a body 100 which is a mounting surface. Since the coil portion 300 may be disposed perpendicular to the sixth surface 106 of the body 100, which is the mounting surface, a mounting area may be reduced while maintaining a volume of the body 100 and a volume of the coil portion 300. For this reason, a larger number of electronic components may be mounted on the mounting board having the same area. In addition, for the above reason, a direction of a magnetic flux induced to the core 110 by the coil portion 300 may be disposed parallel to the sixth surface 106 of the body 100. Accordingly, noise induced to the mounting surface of the mounting substrate may be relatively reduced.

Referring to FIGS. 7 and 8, the coil portion 300 applied to the coil component 3000 according to another exemplary embodiment in the present disclosure may be formed by winding a metal wire MW whose surface is coated with a coating layer CL. Accordingly, in the coil portion 300 applied to the present exemplary embodiment, an entire surface of each of a plurality of turns may be coated with a coating layer IF. The metal wire MW may be a flat wire, but is not limited thereto. In a case in which the coil portion 300 is formed using a flat wire, for example, as illustrated in FIG. 8, the coil portion 300 may have a shape in which a cross section of each turn is rectangular. Meanwhile, although FIG. 8 illustrates that the coil portion 300 is formed by alpha ($\alpha$) winding, this is only an exemplary matter, and the coil portion 300 may also be formed by edgewise winding.

As set forth above, according to the exemplary embodiment in the present disclosure, component reliability deterioration due to plating bleeding during plating for forming the external electrode may be prevented.

The number of processes for manufacturing the coil component may be reduced.

While exemplary embodiments have been shown and described above, it will be apparent to those skilled in the art that modifications and variations could be made without departing from the scope of the present disclosure as defined by the appended claims.

What is claimed is:

1. A coil component comprising:

a body containing magnetic metal particles and an insulating resin;

a coil portion disposed in the body; and first and second external electrodes disposed on the body while being spaced apart from each other and connected to opposite end portions of the coil portion, respectively, wherein a surface of the body has first and second regions in which the first and second external electrodes are disposed, respectively, and a third region in which the first and second external electrodes are not disposed, some of the magnetic metal particles are exposed to the third region of the body, and a monomolecular organic material having a hydrophobic portion is disposed at a surface of the magnetic metal particle exposed to the third region of the body.

2. The coil component of claim 1, wherein the monomolecular organic material further has a hydrophilic portion that binds with a metal present at the exposed surface of the magnetic metal particle.

3. The coil component of claim 2, wherein the hydrophilic portion includes at least one of a carboxylate group, a sulfonate group, or a phosphate group.

4. The coil component of claim 3, wherein the hydrophilic portion, which negatively charged, binds with an iron ion ($Fe^{2+}$ or $Fe^{3+}$).

5. The coil component of claim 3, wherein the hydrophilic portion, which negatively charged, binds with a manganese ion ($Mn^{2+}$) and/or zinc ion ($Zn^{2+}$).

6. The coil component of claim 3, wherein the first external electrode includes a first conductive resin layer that is in contact with the first region of the body, and the second external electrode includes a second conductive resin layer that is in contact with the second region of the body, the first and second conductive resin layers each containing a resin and conductive particles.

7. The coil component of claim 6, wherein the conductive particles include at least one of silver (Ag) or copper (Cu).

8. The coil component of claim 6, wherein each of the first and second external electrodes further includes a first metal layer disposed on the conductive resin layer, and a second metal layer disposed on the first metal layer.

9. The coil component of claim 7, further comprising an insulating substrate disposed in the body, wherein the coil portion includes a coil pattern disposed on at least one surface of the insulating substrate, and first and second lead-out patterns each disposed on at least one surface of the insulating substrate, connected to the coil pattern, exposed to the first and second regions of the body, respectively, and connected to the conductive resin layers of the first and second external electrodes, respectively.

10. The coil component of claim 7, wherein the coil portion is formed by winding a metal wire whose surface is coated with a coating layer.

11. The coil component of claim 2, wherein the monomolecular organic material has a molecular weight of 100 or more and 500 or less.

12. The coil component of claim 2, wherein the monomolecular organic material comprises at least one of alkylbenzene sulfonate, alkyl sulfonate, alkyl sulfate, salts of a fluorinated fatty acid, fatty alcohol sulfate, α-olefin sulfonate, alkyl alcohol amide, alkyl sulfonic acid acetamide, alkyl succinate sulfonate salts, amino alcohol alkylbenzene sulfonate, naphthenate, alkylphenol sulfonate, naphthalene sulfonate, or naphthalene carboxylate.

13. The coil component of claim 1, wherein a plurality of the magnetic metal particles are exposed to the third region of the body while being spaced apart from each other, and the monomolecular organic material is present at exposed surfaces of the plurality of magnetic metal particles.

14. The coil component of claim 1, wherein the monomolecular organic material is further present on at least a portion of the insulating resin forming the third region of the body.

15. A coil component comprising:

a body containing magnetic metal particles and an insulating resin;

a coil portion disposed in the body; and first and second external electrodes disposed on the body while being spaced apart from each other and connected to opposite end portions of the coil portion, respectively, wherein a surface of the body has first and second regions in which the first and second external electrodes are disposed, respectively, and a third region in which the first and second external electrodes are not disposed, some of the magnetic metal particles are exposed to the third region of the body, and a monomolecular organic material having a hydrophobic portion which binds with an iron ion ($Fe^{2+}$ or $Fe^{3+}$) present at an exposed surface of the magnetic metal particle is disposed at the surface of the magnetic metal particle exposed to the third region of the body.

16. The coil component of claim 15, wherein the first external electrode includes a first conductive resin layer that is in contact with the first region of the body, and the second external electrode includes a second conductive resin layer that is in contact with the second region of the body, the first and second conductive resin layers each containing a resin and conductive particles.

17. The coil component of claim 15, wherein the monomolecular organic material has a molecular weight of 100 or more and 500 or less.

18. A coil component comprising:

a body containing magnetic metal particles and an insulating resin;

a coil portion disposed in the body; and first and second external electrodes disposed on the body while being spaced apart from each other and connected to opposite end portions of the coil portion, respectively, wherein the body has a region in which the first and second external electrodes are not disposed, some of the magnetic metal particles are exposed to the region of the body, and a monomolecular organic material having a hydrophobic portion which binds with a metal cation present at an exposed surface of the magnetic metal particle is disposed at the surface of the magnetic metal particle exposed to the third region of the body.

19. The coil component according to claim 18, wherein the hydrophilic portion includes at least one of a carboxylate group, a sulfonate group, or a phosphate group.

20. The coil component according to claim 19, wherein the metal cation includes at least one of an iron ion ($Fe^{2+}$ or $Fe^{3+}$), a manganese ion ($Mn^{2+}$) or zinc ion ($Zn^{2+}$).

* * * * *